METHOD OF RECORDING DISPLACEMENTS

Filed Feb. 13, 1953 4 Sheets-Sheet 1

INVENTOR.
Leif Eric De Neergaard
BY Parker & Carter
Attorneys

Inventor
Leif Eric De Neergaard
by Parker & Carter
Attorneys

Dec. 8, 1959 L. E. DE NEERGAARD 2,916,342

METHOD OF RECORDING DISPLACEMENTS

Filed Feb. 13, 1953 4 Sheets-Sheet 3

Inventor
Leif Eric De Neergaard
by Parker & Carter
Attorneys

INVENTOR.
Leif Eric De Neergaard
BY Parker & Carter.
Attorneys

United States Patent Office 2,916,342

Patented Dec. 8, 1959

2,916,342

METHOD OF RECORDING DISPLACEMENTS

Leif Eric de Neergaard, Madison, Wis., assignor to Frederic W. Olmstead, Washington, D.C., Hans W. Trecksel, Madison, Wis., Deryck A. Gerard, Minneapolis, and John J. Kojis, St. Louis Park, Minn., and Norman S. Parker, Evanston, and Malcolm S. Bradway, Chicago, Ill., and said de Neergaard as trustees, The Northern Trust Company executor of said de Neergaard, deceased

Application February 13, 1953, Serial No. 336,768

25 Claims. (Cl. 346—8)

This invention is directed to a method and systems for recording displacements of a controlled member which may be a machine tool or an element whose movement is an index of a physical quantity being controlled.

I propose to record the desired movements of the member on a control record which may take the form of a relatively thin and elongated strip of material similar to that employed in motion picture film or in sound recording film. According to the invention, I propose to resolve the movements of the afore-mentioned member or members into a series of coordinants, and record the position of the member at any instant for each coordinant thus derived. The invention is directed primarily to a novel, efficient and practical means for placing indicia which is representative of a position with respect to any such coordinant on the control record.

An object of this invention is to record controlled movements of a member with a minimum of back-lash in the recording mechanism due to interconnected parts.

Another object is to prepare a control record with indicia positioned thereon in such a way that controlled movements are continuously represented at all positions of the record and independently of movements of the record as opposed to "increment type" of control records and conventional frequency generating types of control records.

Another object is to create a system of recording so that the recorded displacements of a member desired to be controlled are not limited by the width of the control record.

Another object is to simultaneously resolve the complicated movements of machine tool cycles into separate displacements lying in a system of coordinates and to separately impress the magnitude of each displacement on a control record which can be used to reproduce the original component movements.

Yet another object of this invention is to cause a trace, extending substantially along the length of a control record such as a reel of tape or film, to be displaced at right angles to the length of the control member in a direction and amount identical to the magnitude and direction of displacement of a machine-tool element such as a lathe-carriage or slide.

Another object is the complete elimination of templates, forms and other contour-controlling members in the automatic control of complicated machine-tool cycles, thus allowing the overall physical dimensions of contouring-machines to be reduced or, under certain conditions, saving valuable floor space in fabricating shops.

Yet another object is to simultaneously measure and record the displacement of a stylus, template-follower or similar member in relation to the two normal axes of a two-dimensional Cartesian coordinate system.

Another object is to simultaneously measure and record the magnitude of the displacements of each successive position, occupied by a point traversing a spatial path, relative to the normal axes of a three-dimensional Cartesian coordinate system.

Still another object is to continuously measure the successive displacements of a point in relation to the normal axes of a three-dimensional Cartesian coordinate system and to simultaneously record the direction and magnitude of each of the displacements on separate flux-transmissive lanes or tracks impressed along the length of a motion-picture type film or similar control record.

Another object is a system of permanently recording linear or angular displacements in which the recording takes the form of equidistant, parallel, flux-transmissive lanes or traces continuously impressed longitudinally to the length of a control record such as motion-picture type photographic film or magnetic flux tape.

Another object is to impress parallel flux-transmissive tracks along the length of a control-record while simultaneously causing displacement of the tracks perpendicular to the length of the control record's length in an amount and direction proportional to the movement of a displacement-measuring member.

Other objects will appear from time to time in the course of the ensuing specification and claims.

Referring generally now to the drawings.

This application is a continuation in part of my co-pending application Serial No. 571,338, filed on January 4, 1945, now Patent No. 2,628,539, issued February 17, 1953.

Figures 1, 2:
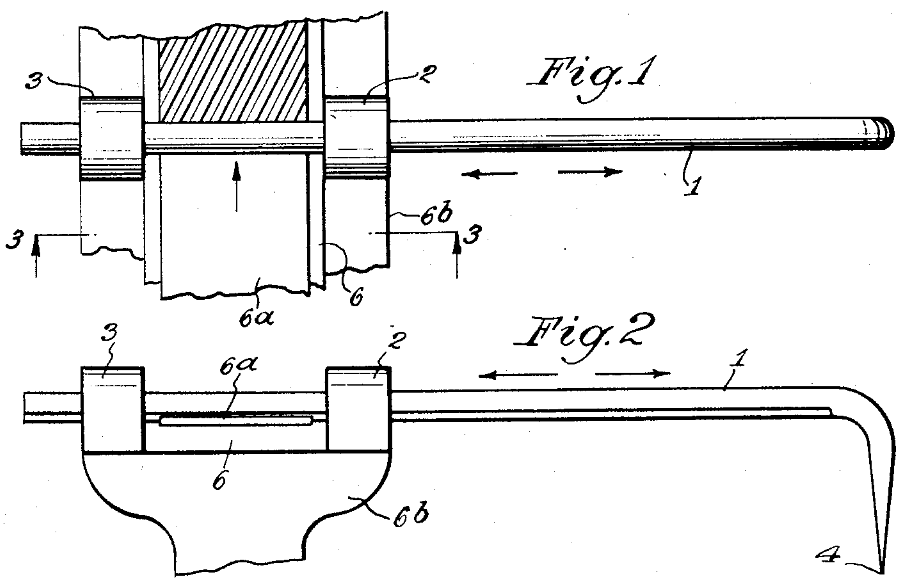
Figure 1 is a plan view of one species of displacement recorder employing the principles of the invention.
Figure 2 is an elevational view of the system shown in Figure 1.

Referring specifically now to the drawings wherein like elements are designated by like characters throughout, and in the first instance, to Figure 1:

Figure 1 illustrates a displacement-recorder which may be used to continuously measure a single linear displacement and cause the direction and magnitude of the displacement to be permanently recorded on a control-record. A meter-bar 1 is slidably supported by the two bearings, 2 and 3. The right-hand end of the meter-bar terminates in a dependent stylus 4. The meter or cutter bar is prevented from rotating by a key way (not shown) extending along its length and a key (not shown) integral to one of the bearings.

Figure 3:
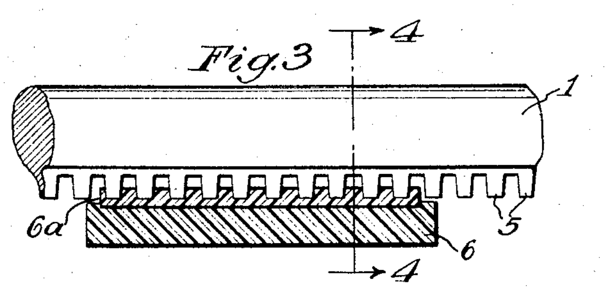
Figure 3 is an enlarged sectional view of the device shown in Figure 1 taken along the sectional lines 3—3 of Figure 1.
Figure 4:
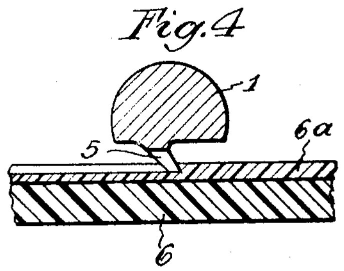
Figure 4 is a sectional view of the device shown in Figure 3 taken along the sectional lines 4—4 of Figure 3.

The meter-bar is preferably made from steel, preferably having a substantial chrome-plated skin for wear-resistance. A plurality of identical cutting-teeth 5, or indicia impressing members, extend substantially along the length of the meter-bar 1 which may have the rack-form illustrated in large scale, in Figure 3, or may be similar to the basic racks of the 14½ degree or 20 degree full-depth involute or other system. Figure 4 is a cross-section through the meter-bar and clearly illustrates that each of the cutting-teeth 5 are shaped similarly to planer or shaper cutting-tools. The pitch of the cutting-teeth is constant and will be taken to be, for purposes of illustration, exactly 25 teeth per inch.

A strip of transparent material, preferably a plastic which is a polymerized derivative of methacrylic acid such as "Lucite" or "Plexiglas," serves as a control-record 6, Figures 1, 2, 3, 4 and 5. The record has an upper portion **6*a* of a predetermined width defining a control lane. The width of this portion of the control-record will be taken to be .500″ wide, its thickness .040″, while its length may be ten, a hundred, or more feet in length, dependent upon the length of the cycle of linear-displacements of the stylus 4. A record support 6*b* is formed integraly with bearings 2 and 3 and supports the record throughout a portion of its length so that the teeth 5** will cut into the record.

The control-record 6 is continuously displaced perpendicular to the length of the meter-bar and in the direction indicated by the arrow, Figure 1. The rate of linear-displacement is held constant by a control-record driving means which, although not shown, will be understood to be similar to the reel-drive of a motion-picture film-reeling device.

The rate of displacement of the control-record should be held at preferably five times the highest rate at which the stylus 4 is moved. Therefore, the control-record will be constantly moved at the rate of 50 inches per minute if the maximum rate of displacement of the stylus does not exceed 10 inches per minute.

The plastic strip, constituting the control-record, is continuously and positively drawn against the cutting teeth 5, integral with the meter-bar 1, causing a plurality of identical, equidistant grooves to be simultaneously cut on one surface of the strip. These grooves will be generated in exact parallelism with the edges of the plastic-strip at the instants when the meter-bar is static.

If the meter-bar is moved from right to left (as illustrated by Figure 1) at the rate of exactly 10 inches per minute, the angle of displacement of the simultaneously generated grooves to the parallel edges of the plastic strip would be: $^{10}/_{50}$=.2000=tangent of 11°19′. Conversely, opposite movement of the meter-bar at the same rate will cause the grooves to be oppositely displaced at the same angle of 11°19′. Therefore, movement of the meter-bar from left to right causes the generated or cut grooves to be displaced or skewed towards the right-hand edge of the control-record while opposite displacement of the meter-bar causes the grooves to be oppositely displaced towards the left-hand edge of the control-record.

Any rate of displacement of the meter-bar produces a corresponding deflection to be imparted to the grooves so that the direction and magnitude of angular displacement of the grooves, measured in relation to the length of the control-record, becomes a precise record of the rate and direction of movement of the stylus and meter-bar from instant to instant.

Figure 5:
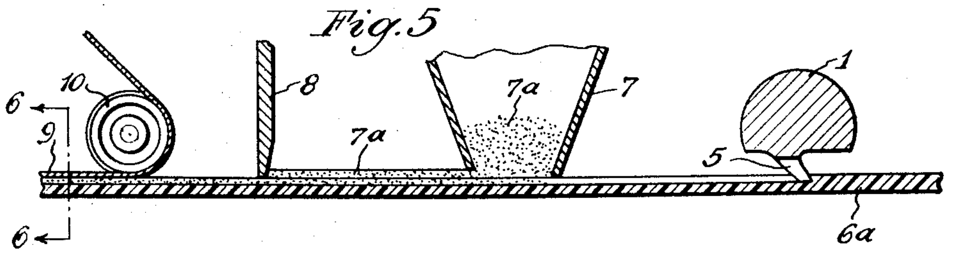
Figure 5 is a diagrammatic view showing a system for preparing the record shown in Figures 1 thru 4, inclusive.
Figure 6:
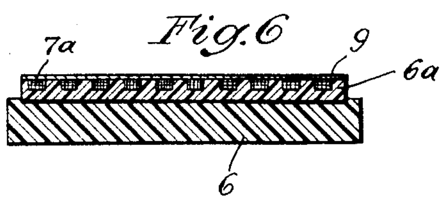
Figure 6 is an end sectional view of the record prepared by the system shown in Figure 5 taken along the sectional lines 6—6 of Figure 5.

Figure 5 illustrates, in a schematic manner, further processing of the plastic-strip after having the equidistant grooves generated along its length by the cutting action of the meter-bar. As indicated, the plastic-strip, constituting the control-record, is drawn from right to left. As the strip is continuously advanced under a hopper 7, finely comminuted pigment **7*a* is delivered by gravity from the hopper to the grooved-surface of the plastic-strip, completely filling the grooves. The strip is then advanced to a stationary plow 8**, which shears off any excess pigment lying on the ungrooved surfaces of the plastic strip. The grooves are thus filled with dense, opaque powder while the intervening lands or surfaces, lying between the powder-filled grooves, are perfectly clean to offer maximum transmission to light-flux.

The last operation is to continuously apply a very thin, tough, transparent plastic-strip 9, to the upper surface of the control-record and thus permanently seal the opaque pigment in the grooves. "Cellophane" tape having one tacky surface may be used for this purpose. As indicated, the thin protecting tape may be applied under pressure by the action of a presser roll 10, bearing downwardly towards the support **6*b***, which slidably supports the control record as it is being grooved.

It will be understood that in Figures 1 through 6, inclusive, I illustrate a means for preparing the control-record in which only a single coordinate of movement is represented on the control member or record. It should, however, be apparent that a meter-bar provided with a series of spaced teeth will be employed for each coordinate movement. The spaced teeth or marking members on the meter-bar move transversely to the direction of movement of the record proportional to the rate and direction of movement of the meter-bar along one coordinate. The grooves cut in the record or impressed on the record and the control channels or traces formed thereby are limited to a predetermined area on the record as defined by portion **6*a*** in view of the spacing of the teeth or members from the body portion of the record. The meter-bar may have any desired length depending upon the length of the movement desired. As thus formed, the record is divided into light flux transmissive and non-flux transmissive areas.

Whereas I have shown a series of teeth or indicia impressing members with a predetermined spacing in Figures 1 through 6, inclusive, I wish it to be understood that no particular number of teeth to the inch is critical. Essentially, the arrangement is such that when one trace intersects the edge of the predetermined area or control lane on the record as defined by the member or portion **6*a***, due to a predetermined displacement of the meter-bar, another trace or groove appears on the opposite side or edge of that predetermined width or area of record so that the effect created is that of having a single trace on the controlled record with an unlimited amount of displacement. A record prepared as in this example may be utilized in a control system shown in my co-pending application Serial No. 571,338, filed on January 4, 1945, now Patent No. 2,628,539.

Figures 7, 8:
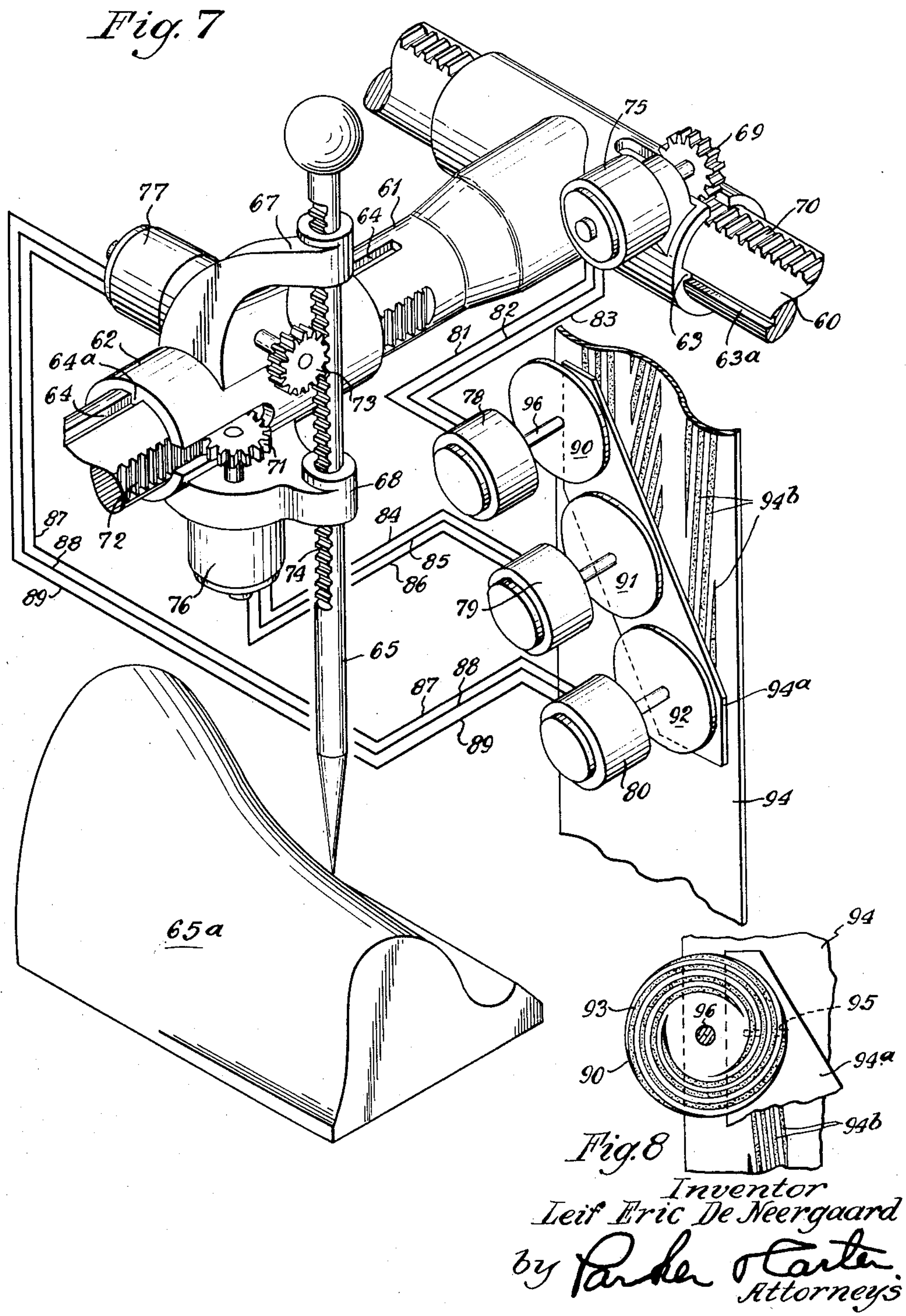
Figure 7 is a perspective view of another species of mechanism used in my recording method.
Figure 8 is an enlarged detail view of one portion of the system shown in Figure 7.

Figure 7 is a partial view taken in perspective, of the elements, important to the operation of one species of three-dimensional displacement-recorder whose members are in many respects, similar to the main members of the two-dimensional displacement-recorder just described. Therefore, although not shown, it will be understood the device illustrated by Figure 7 has a base and two upwardly-extending brackets to afford support to a longitudinal member 60, whose axis is parallel to the horizontal plane surface of the base. An outwardly-extending boom 61, slidably supports a cross-head 62, which is prevented from rotation about the boom by provision of a key-way 64, cut in the boom and a cooperating key **64*a*, carried integral with the cross-head. The boom is slidably supported by the longitudinal member. The axis of the boom is maintained parallel to the horizontal plane-surface of the base by means of a key 63 secured to the T-end of the boom and sliding in the key-way 63*a*, generated along the length of the longitudinal member. A stylus 65 is slidably supported in a vertical position by two brackets 67 and 68, integral with the cross-head 62. The stylus may terminate at its lower end in a roller or a sharp hardened tip, as illustrated, and in a smooth spherical-knob at its upper end. Stylus 65 is adapted to follow and measure the outline of a work piece 65***a*.

Three similar pinions separately mesh with three racks; pinion 69, meshing with the longitudinal member's rack 70, pinion 71, meshing with the rack 72, generated along the boom's length with the third pinion 73 meshing with the rack 74, cut along the length of the stylus 65. For purposes of description it will be assumed that the pinions have 16 teeth of exactly .0625 circumferential pitch. Their three coacting racks 70, 72, and 74, are of identical pitch. The three pinions therefore pass through exactly one revolution for each inch that the pinions are rolled along their cooperating racks. Pinion 69 is integrally mounted on the rotor-shaft of a generator 75. The rotor-shaft of generator 76, similarly mounts the pinion 71, while pinion 73 is integral to the rotor-shaft of the generator 77.

The rotor of generator 75 is electrically connected to the rotor of a motor 78 by three conductors 81, 82 and 83. Similar connection is made between the rotors of generator 76 and a motor 79 by conductors 84, 85, and 86 while the rotors of generator 77 and a motor 80 are connected through the leads 87, 88 and 89. The six stator-windings of the three generators and their co-acting motors are all energized with single-phase alternating current of preferably a standard frequency from the same identical source. The representations of the two conductors, carrying this alternating current are for purposes of clarity, not shown in Figure 7.

Each generator and its electrically-cooperating motor, constitutes a self-synchronous remote control, commonly known as "Selsyn," "Autosyn" or "Synchro-tie" systems. These devices are so commonly used to accurately transmit angular motion between two or more remote devices which cannot be conveniently mechanically interconnected, that it is not considered necessary to further describe their action. Suffice it to say that by the use of this type of remote-control device, it is possible to cause the discs 90, 91 and 92, separately mounted on each of the rotor shafts of the motors, to reproduce any angular displacement of their cooperating generator's rotor-shaft.

The disc 90 is mounted integral to the rotor-shaft of the motor or "Selsyn" repeater 78, the disc 91 is similarly mounted on the rotor-shaft of the motor or repeater 79, while the third disc 92 is likewise mounted on the rotor-shaft of the motor 80.

In this manner, a 1.000″ displacement of the boom 61, parallel to the longitudinal-member 60, or parallel to the X—X or longitudinal axis of a three-dimensional Cartesian coordinate system, causes angular-displacement of the disc 90, through exactly 360°. A similar linear displacement of the cross-head 62, along the boom's length or parallel to the Y—Y or lateral axis of the three-dimensional coordinate system, causes a 360° rotation of the disc 91. Movement of the stylus 65, parallel to the Z—Z or vertical axis of a three-dimensional Cartesian coordinate system through 1.000″ will cause a 360° angular displacement to be imparted to the disc 92. Obviously, the linear-displacement of either the boom, the stylus-head or the stylus will cause an angular displacement to be imparted to the cooperating discs, in amounts and directions exactly proportional to the linear-displacements.

By the use of "Selsyn" or similar systems for electrically transmitting mechanical motion, it is feasible to locate the repeaters or motors 78, 79 and 80 and the discs 90, 91 and 92, many hundreds of feet, if desired, from the main mechanical elements of the three-dimensional displacements-recorder, illustrated by Figure 7. In some installations the use of flexible-shafting to accurately transmit rotation of the pinions 69, 71 and 73 to the discs 90, 91 and 92 may be substituted for the use of electrical "Selsyn" systems.

The three discs are identical and preferably made of thin optical glass or transparent plastic. One face of each disc is opaqued by having a coat of aluminum copper or silver evaporated upon its surface, although a coating of certain opaque lacquers or enamels may be used. Material of this masking-coat is removed either by mechanical-working, etching, or by photo-engraving to form a substantially three-thread spiral of the opaque masking coat. The configuration of the spiral 93 is clearly illustrated in Figure 8. The pitch of each spiral is such that it advances outwardly from the disc's center, a distance of exactly .1200″ when displaced through 360° in a clock-wise direction. The convolutions of the spiral constitute indicia impressing members. The areas of the disc, lying between the spirals, are transparent and, therefore, light transmissive. The three motors 78, 79 and 80, and discs 90, 91 and 92 are preferably mounted in staggered relationship to a stop-plate 94*a* and motion picture type photographic-film 94, illustrated by Figure 7. Although not illustrated in the figure, it will be understood that the film-drive is similar to the drive described in Figures 1–6 and, therefore, consists of a storage reel, a drive reel, and a drive-motor with speed-regulating control, to maintain a constancy of film movement. A light-tight enclosure is provided for the enumerated elements.

Figure 8 illustrates a broken-section of the photographic-film 94, and a broken-section of the stop-plate 94*a*, as well as details of the disc 90, identical to the discs 91 and 92. Each of the discs is preferably separated from the plane-surface of the stop-plate by one or two-thousandths of an inch. The stop-plate is similarly separated from the light-sensitive surface of the photosensitive film 94. An aperture 95, Figure 8, is cut through the stop-plate. Two similar apertures, although not illustrated in Figure 7, are provided to cooperate with disc 91 and disc 92 in a manner identical to the aperture coacting with disc 90. The width of each aperture is preferably the same as the width of an opaque spiral or .020″ while its length is .1200″ or on the order of the radial width of the spiral convolutions.

Figures 9, 10, 11, 12:
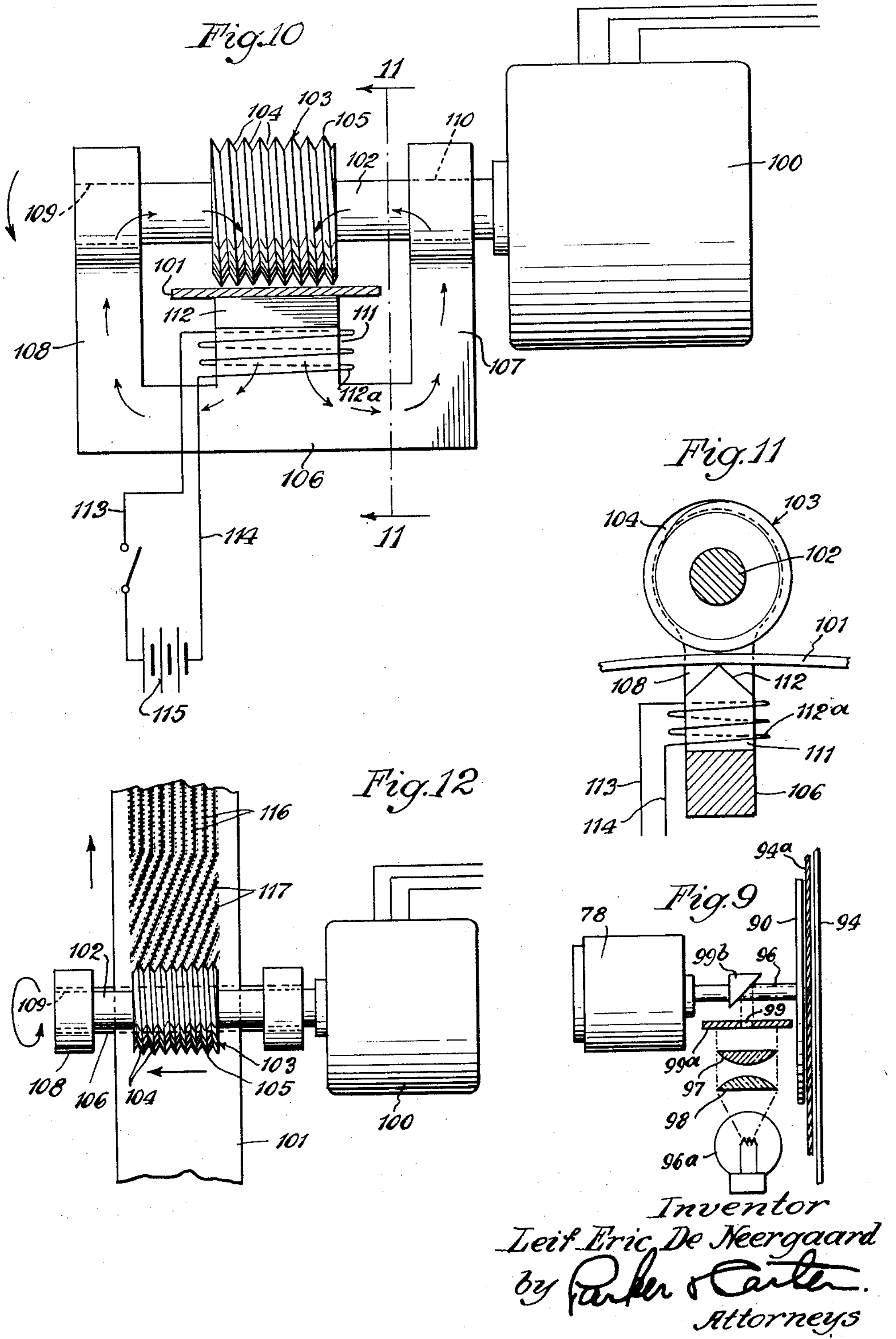
Figure 9 is a diagrammatic view of a portion of the light system shown in Figures 7 and 8.
Figure 10 is an elevation view of a portion of another species of mechanism used in my record method.
Figure 11 is a sectional view of the device shown in Figure 10 taken along the section lines 11—11 of Figure 10.
Figure 12 is a plan view of the mechanism shown in Figure 10.

Figure 9 illustrates the light system used in conjunction with disc 90. Discs 91 and 92 have identical individual systems. The "Selsyn" repeater or motor 78 is shown with the disc 90 integrally mounted on one end of its rotor shaft 96. The rays from a filament-type projection lamp 96*a*, preferably supplied from a direct current source, are gathered by the two condensing lenses 97 and 98, into a light pencil of parallel rays. The light pencil is stopped down by an aperture 99, cut through a stop plate 99*a*, to a rectangular cross section whose dimensions may be approximately .150″ x 150″ or greater. The light pencil is projected on a plane surface of the mirror block 99*b*, is deflected at 90°, parallel to the axis of the rotor shaft, towards and normal to the plane surface of the disc 90. This pencil of concentrated light flux coincides with the aperture 95, cut through the stop plate 94*a*. By the use of the instrumentalities illustrated in Fig. 9, three .020″ wide parallel traces 94*b* are caused to be continuously photographed upon the light-sensitive surface of the film in response to the concentrated light flux which passes through the transparent areas lying between the opaque spirals.

The spirals or helical curves formed on the discs continuously move across the record and the effect is that of having a member of unlimited length for movement in either direction. The projected light exposes certain areas of the photosensitive film, thus impresses traces of predetermined flux transmissive characteristics on the film.

Movement of the stylus or measuring member 65 through any spatial path is resolved into coordinates of movement with a proportional displacement imparted to the traces for movement along each coordinate.

Figures 7 and 8 represent a species of the system which marks or impresses light transmissive traces on the control-record, there being a lane of traces for each coordinate or movement. The traces are confined to a predetermined width or control lane of the control-record by the aperture 95.

The stylus 65 may follow a succession of curves or "cutting" outlines on the template or work piece 65*a* and thus continuously represent the position of the stylus with respect to each coordinate by the plurality of generally parallel traces. Movement of the stylus may represent successive positions of a cutting member in a work forming cycle. The record, as prepared here, may then be employed to control the cutting member in the manner shown in my co-pending application Serial No. 337,084, filed on February 16, 1953, now Patent No. 2,882,475, dated April 14, 1959.

Figures 10 thru 13 illustrate a further species of the invention. In this species, magnetic flux transmissive traces are marked or impressed upon the control-record. As in the previous species, coordinants of movement of the member, whose movement is desired to be reproduced, are represented on the control-record by a plurality of generally parallel traces.

In Figure 10, I illustrate one portion of the system used to reproduce displacements along one coordinate of movement of the member. In Figure 10, 100 indicates a "Selsyn" motor that is electrically connected to another Selsyn motor driven by a rack and gear connection similar to the rack and gear arrangements shown in Figures 7 thru 9, inclusive. 101 indicates a control record which, in this example, takes the form of a generally elongated thin and flat member. No particular material is critical in forming the tape or record itself. A tape of special stainless steel on the order of .002 inch thick can be used as the media upon which the magnified traces are impressed, although it will be found that so-called coated recording tape can be used satisfactorily. This type of tape or record has a tough plastic backing of cellulose acetate, nylon, of vinyl, from .002 inch to .004 inch thick upon which iron oxide is very evenly coated to a thickness of two or three mills. However, since the magnetic signal storage properties of the recording tape is substantially proportional to the thickness of the outside coating, it will be found that in many industrial controls a thickness or coating of ten or even more mills will be desirable to afford a very good signal to noise ratio.

Selsyn 100 has a shaft 102 extending from one end thereof upon which is formed a helical screw or trace impressing member 103 of greater diameter than the shaft 102. Helical screw 103 has a number of threads 104 which extend closely adjacent to the upper surface of the control record 101. The threads of the screw constitute indicia impressing members. Any number of threads may be generated on the helical screw or trace marking member 103. The pitch of the threads on the screw corresponds to the spacing of the plural parallel traces which are impressed upon the record 101. It will be apparent that the member 103 will be rotated through one revolution for each revolution of the rotor of the Selsyn 100 and for each revolution thereof each thread will move through a distance equal to the pitch of the threads. The outer portions 105 of the threads constitute the actual marking or indicia impressing members. During the recording process, the record or film 101 is fed in the direction of the arrow shown in Figure 12 at a generally constant rate. Systems for so moving the film are so well-known that it is not thought necessary to illustrate them here.

Designated generally at 106 is a magnetic circuit establishing and record supporting member. Member 106 is preferably formed of Armco "A" iron. While this particular type of iron is not critical, the member 106 should be formed of a material having a relatively high magnetic retentivity. The member 106 has upstanding portions 107 and 108 that embrace the screw threaded member 103. The shaft 102 of the Selsyn 100 passes through bores 109 and 110 formed in the upstanding leg portions of the member 106. Intermediate the legs 107 and 108 an upstanding record supporting member 111 is formed. As will be seen best in Figure 11, member 111 has a tapered upper portion 112 which contacts the lower surface of the record 101. Member 111 has a length related to the outside diameter of the helical screw 103 and to the bores 109 and 110 of the member 106 so that when the lower surface of the record 101 is in contact with the peak or upper portion of the member 111, the upper portion of the record will be spaced a very slight distance from the peaks or surfaces of the threads 104.

The portion of the shaft 102 between the outside of the legs 107 and 108 and the helical screw 104 are also formed of Armco "A" iron or its equivalent. A coil 112*a* is wound about the member 111 and is energized through leads 113 and 114 connected to a battery 115 or other suitable energizing device. When the coil is energized, a magnetic circuit will be established through the member 106, shaft 102, screw 104, and record 101. If, for example, the upper portion 112 of the member 111 has a south polarity, as is indicated in Figure 10, the lines of force in the member 106 will, in the direction of the arrows indicated in Figure 10 and the crests of the threads 104, have a north polarity. The areas on the record 101 adjacent to the crests of the threads will be given a north polarity, while the intervening areas between the crests of the threads will have no polarity, or it may be assumed will have south polarity. Thus, if the record 101 is fed in the direction of the arrow indicated in Figure 12 at a generally constant rate, and the shaft 102 and screw 103 are stationary, a plurality of generally parallel magnetic traces, which will be parallel to the direction of movement of the control record, as shown at 116 in Figure 12, will be marked or impressed upon the control record. The impressed traces divide the record into parallel areas of different flux transmissive qualities. The traces are adapted to transmit magnetic flux.

However, if relative movement transverse to the direction of movement of the record occurs between the threads 104 and record 101, the traces will be displaced with respect to the direction of movement of the record 101. For example, if the screw member 103 is rotated in the direction of the arrow indicated in Figures 10 and 12, the threads of the screw member 103 will appear to move across the control record in a direction from right to left, as indicated by the arrow in Figure 12. Thus, the traces will be given a displacement from right to left, as indicated at 117. If the shaft and screw member are rotated in the opposite direction, the traces will be given a displacement from left to right, or opposite to the displacement indicated at 117. The traces are confined to a predetermined area or control lane on the record by the length of the screw. In other words, the direction of movement of the traces corresponds to the direction of movement of the rotor of the Selsyn 100 and the traces formed on the control record will be displaced at a rate corresponding to the rate of movement of the rotor of the Selsyn 100.

The system shown in Figures 10, 11 and 12 is adapted to continuously impress a plurality of generally parallel traces along a control-record. In this species, the traces are confined to an area on the control-record which is defined by the width of the helical screw 103. The magnetic traces impressed upon the record have different characteristics than the areas between the traces. A control-record as prepared in this system may be employed in conjunction with a control mechanism for a movable member such as a machine tool, as is fully shown and described in my co-pending application Serial No. 337,084, filed on February 16, 1953, now Patent No. 2,882,475, issued April 14, 1959.

Figure 13:
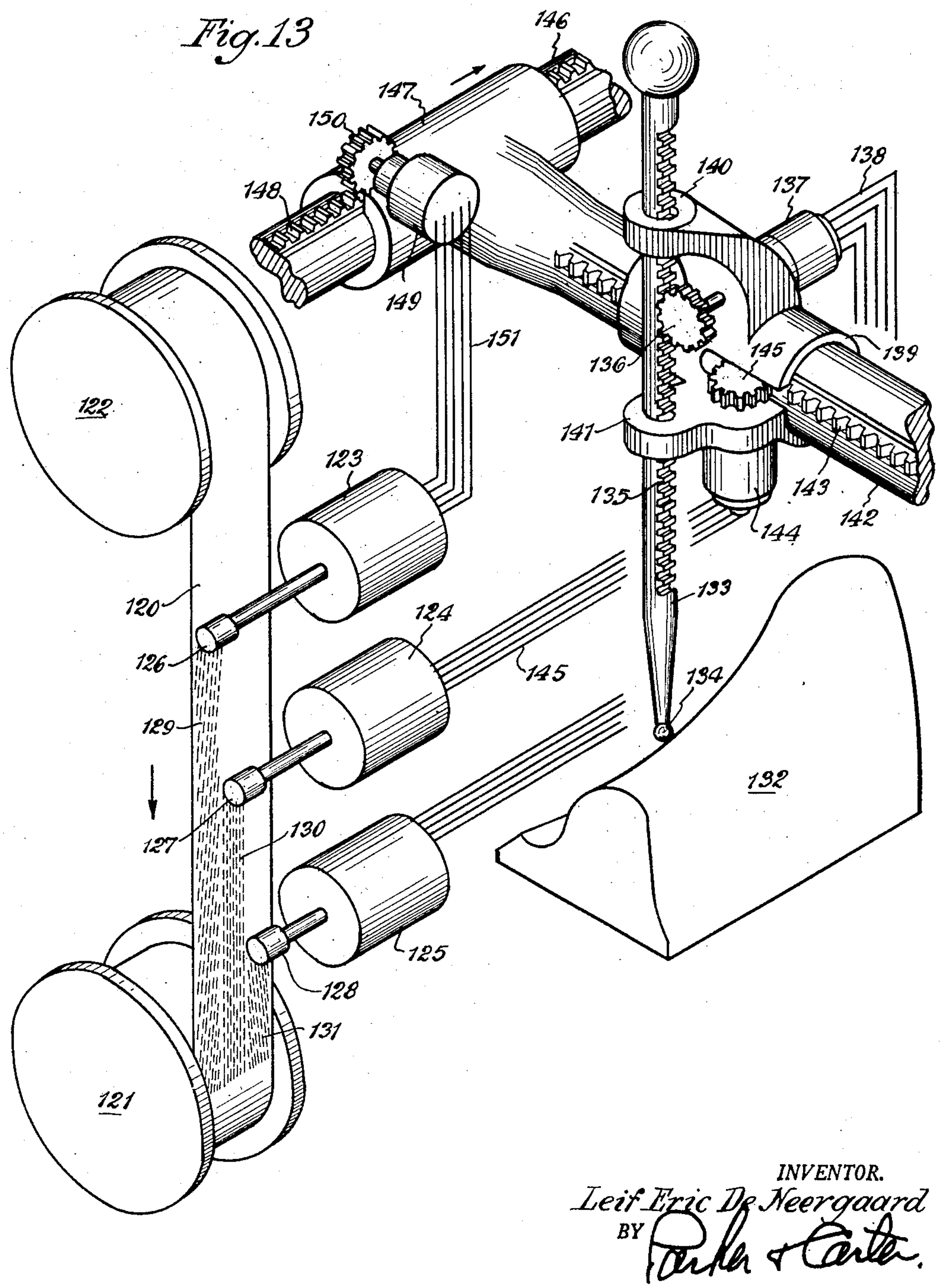
Figure 13 is a perspective view of my system employing the mechanism shown in Figures 10, 11 and 12.

The rotor of the Selsyn motor 100 and the helical screw member 103 are adapted to be rotated as an index of a coordinate of movement of a member. In Figure 13, I show a system for correlating the movement of the rotor and helical screw 103 with the desired movement of the member. In Figure 13, a control-record formed of a generally elongated, thin, flat recording film is designated generally at 120. 121 represents a film driving and storage reel and 122 represents a film storage reel.

For purposes of description, it will be assumed that the record formed by the film is fed downwardly, as shown by the arrow in Figure 13. It will be assumed that the reel 121 is driven at a generally constant rate by a motor or other suitable mechanism which is not shown. Selsyn motors 123, 124 and 125 have associated with their rotor shafts trace impressing members 126, 127 and 128, which are positioned closely adjacent to the surface of the record 120. Although not shown in Figure 13, each of the members 126, 127 and 128 have associated therewith a generally U-shaped magnetic circuit establishing member as shown by member 106 in Figure 10. Furthermore, it will be assumed that each of the members 126, 127 and 128 have threads similar to those shown in Figure 10, so that when the record is advanced in the direction shown in Figure 13 a magnetic circuit will be established between the members and record so as to impress upon the record a plurality of generally parallel traces, as shown in Figures 10 thru 12. The members 126, 127 and 128 each operate in a different confined width or control lane on the control-record. The magnetic traces impressed upon the control-record are thus divided into a plurality of control lanes, there being one lane for each coordinate of movement desired. For example, member 126 impresses magnetic traces along a lane 129 which may be assumed to be, for purposes of description, the control lane for movement in a lateral direction or along a Y—Y axis. Member 127 generates or impresses a series of magnetic traces along a control lane 130 which may be assumed to be the control lane for movement of the member in a longitudinal direction, or along an X—X axis. Similarly, member 128 is adapted to impress magnetic traces in a control lane 131 which may be assumed to be a control lane for movement of the member in a vertical direction, or along a Z—Z axis.

132 represents a piece of work whose configuration is desired to be reproduced, as by the action of a cutting tool. Designated generally at 133 is a follower member having a portion 134 adapted to follow a predetermined outline of the member 132. Movement of the member 133, and accordingly, the outline of the work piece or member 132, is resolved into a system of coordinates in much the same manner as that shown in Figures 7 and 8. The member 133 has a series of gear teeth 135 generated along the length thereof which mesh with a pinion 136 directly connected to the rotor of a Selsyn motor 137 which is electrically connected through leads 138 to the Selsyn motor 125. The motor 137 and pinion 136 are carried by a cross-head 139 having a pair of spaced members 140 and 141 which guide the member 133. Cross-head 139 is slidably mounted upon a boom 142 extending in a longitudinal direction or along an X—X axis. A series of rack teeth 143 are generated along the length of the boom 142. Cross-head 139 carries a Selsyn motor 144 having a rotor carrying a pinion 145 in mesh with the rack teeth 143. The Selsyn motor 144 is electrically connected through appropriate leads 145 to the Selsyn motor 124. Boom 142 is slidably mounted upon a boom 146 extending in a lateral direction or along a Y—Y axis by means of a cross-head 147 integral with the boom 142. A series of rack teeth 148 are formed on the boom 146. Cross-head 147 carries a Selsyn motor 149 having a rotor carrying a pinion 150 in mesh with the rack teeth 148 on boom 146. The Selsyn motor 149 is electrically connected through leads 151 to the Selsyn motor 123.

For purposes of description, the circumferential pitch of the pinions and the pitch of the threads of the trace impressing members will be assumed to be such that any linear advance of the pinion shaft will be reflected in a corresponding linear advance of the threads.

The pairs of Selsyn motors 123 and 149, 124 and 144, 125 and 137, are typical Selsyn systems wherein movement of one rotor of the pair results in proportional movement of the other rotor of the pair. Rotation of a rotor in any pair produces a corresponding rotation of the rotor of the other motor of the pair, as is well-known to the art. The effect produced is the same as having the rotors of each pair of Selsyn motors mechanically connected by means of a common shaft.

The follower member 133 is thus given three coordinates of movement. In order to follow any desired outline on the work piece 132 and record those movements on the control-record 120, an operator or attendant simply moves the follower member 133 thru the desired outline. Movement of the follower member 133 thru any spatial path is resolved into three coordinates of movement and recorded on the control-record 120 in control lanes, as represented at 129, 130 and 131. Thus, if it is desired to form a work piece having the configuration shown in 132, it is only necessary to move the follower member through a series of spatial paths representative of successive paths taken by a cutting tool and forming a work piece as shown by work piece 132.

If desired, another control lane may be formed on the control-record which would correspond to rotation of the work piece 132 at any point in the cycle. In such an example, the work piece 132 may be mounted upon a supporting table which would be mounted for rotation about a predetermined axis. The control traces would be impressed on the control record by means of a helical screw member as shown. The helical screw member would in turn be controlled by a Selsyn system driven by any appropriate connection between the work table and system.

Movement of the member 133 is thus resolved into a series of displacements imparted to a plurality of traces. The displacements of the traces are a precise index of the displacements of the member 133. The traces in the Y—Y control lane 129 are displaced towards the right, as shown in Figure 13, indicating that the member 133 has just moved in the direction of the arrow along the Y—Y axis. The traces in the control lane 130 have no displacement, as will be apparent in Figure 12, representing that no movement along the X—X axis has occurred, while the member 133 was moving along the Y—Y axis. The traces in the control lane 131 are displaced towards the left, as shown in Figure 13, which indicates that the member 133 has undergone movement in a vertical direction while movement along the Y—Y axis occurred. Thus, the movement of the follower member 133, which is representative of the movement of a cuting tool or other member, is resolved into a series of displacements imparted to a plurality of parallel traces with respect to the edge of the control-record 120. Displacement of the member 133 in a pre-determined direction and at a pre-determined rate along any coordinate is reflected into a corresponding rate and direction of displacement imparted to the parallel traces for each coordinate control lane on the control record 120.

Another species of recording will now be described. This species is similar to the one shown in Figures 1 through 6, inclusive. In this species, the record is formed of a relatively tough, plastic material having a shape somewhat similar to the shape of the record shown in Figure 3. One surface of the record is coated with a generally opaque ink. The record is supported in a manner similar to the support shown in Figures 1 through 6, inclusive. A series of cutting teeth are formed on a stylus or meter-bar, similar to the one shown in Figures 1 and 2, and supported in the manner shown by these figures. The teeth are arranged to cut through the ink formed on the surface of the control-record, and the ing cut is removed, thus impressing a series of light-transmissive traces on the control-record. Thus, a series of alternate light-transmissive and non-light-transmissive traces are formed on the control-record. Displacements are imparted to the traces in a manner similar to that shown in Figures 1 through 6, inclusive.

In all forms of the invention disclosed, a plurality of generally parallel traces are impressed or marked upon a control-record. The traces are spaced so that certain of the traces have predetermined flux transmissive characteristics with the traces formed by the spaces between the flux transmissive traces having different flux-transmissive characteristics. In all forms of the system herein shown and described, displacement imparted to the traces is a precise index from instant to instant of the position of a member whose movements are desired to be reproduced. The traces are recorded in such a manner that the traces are confined to a predetermined control lane, or width of the control-record. Whenever a trace intersects an edge of this control lane or predetermined width, another trace appears upon the opposite side of the control lane or predetermined width with the new trace having the same rate and direction of displacement as the edge intersecting trace.

Whereas I have shown and described an operative system having several forms, I wish it to be understood that the showing and description thereof is to be taken in an illustrative or diagrammatic sense and not in any limiting sense. There are many modifications of the invention which will fall within the scope and spirit of the invention and which will be apparent to those skilled in the art. I therefore wish that the showing and description herein be limited only by the scope of the hereinafter appended claims.

I claim:

1. The method of recording the displacement of a point in a plane on a lineally extending control member including the steps of moving said control member, establishing a control channel of uniform width having a plurality of parallel flux transmissive traces on said control member in parallelism with its direction of movement, simultaneously maintaining said traces in parallelism while displacing them in a direction transverse to the direction of movement of said control member proportionally to displacement of said point.

2. The method of recording the displacement of a point in a plane of reference on a control member including the steps of moving said control member, impressing a control channel of uniform width having a plurality of parallel flux conducting traces on said control member in parallelism with its direction of movement, maintaining said traces in parallelism while imparting deflections to them, as they are established, transverse to the direction of movement of said control member by amounts and directions proportional to the displacement of said point.

3. The method of recording displacements of a member in a plane on a control record with a plurality of indicia marking members including the steps of creating a control channel of uniform width having a plurality of parallel traces on a record, maintaining said traces in parallelism while producing relative movement in directions transverse to the length of said channel between said control channel, as it is created, and said indicia marking members proportional to the displacement of said member in said plane.

4. The method of recording displacements of a member in a plane of reference on a control record by a series of uniformly spaced indicia impressing members including the steps of moving a control record adjacent said indicia impressing members whereby a control lane of uniform width having a plurality of generally parallel traces is established on said record, producing relative movement between said uniformly spaced indicia impressing members and said control record in a direction transverse to the length of the control lane whereby said parallel traces are displaced, while maintained in parallelism, proportional to the displacement of said member.

5. The method of representing displacements of a member in a plane of reference on a control record by a series of uniformly spaced indicia marking members including the steps of moving said control record relative to said indicia marking members whereby a control lane of uniform width having a plurality of parallel traces is established on said record adjacent the uniformly spaced marking members, simultaneously moving the marking members transversely to the length of the control lane at a rate corresponding to the displacements of said member, and limiting the marking of said indicia marking members to the control lane.

6. A method of representing displacements of a member including the steps of marking a control record with a plurality of elongated parallel traces representative of a coordinate of desired movement of the member, displacing said traces laterally at a rate proportional to movement of the member, confining the marking to a predetermined width of the control record whereby a trace if displaced far enough, will intersect an edge of the predetermined width of the record and terminate, initiating marking another trace on the record at the laterally opposite edge of said width whenever said trace intersects said edge, the last named trace being displaced in the same direction and at the same instantaneous rate as said edge intersecting trace.

7. A method of representing displacements of a member including the steps of marking a control record with a plurality of parallel traces representative of a coordinate of desired movement of the member, displacing said traces with respect to the length of the record proportional to the rate and direction of movement of the member, confining the marking to a predetermined width of the control record whereby a trace, if displaced far enough, intersects an edge of the predetermined width of the record and stops, and initiating marking another trace on the record at the laterally opposed edge of said width whenever said trace intersects said edge, with said last named trace being displaced at the same instantaneous rate and in the same direction as said edge intersecting trace.

8. The method of recording displacements of a member on a control record with a series of spaced indicia impressing members, including the steps of providing a control lane having a plurality of parallel traces on a record, moving the record in the direction of extension of said lane adjacent the impressing members, and producing relative movement of said impressing members, as a group, while maintaining their relative spacing, in a direction transverse to the length of the control lane at a rate indicative of the rate and direction of desired movement of the member along a coordinate of such movement.

9. A method as recited in claim 4 wherein the said traces are impressed on the record by cutting into the surface of the record with the impressing members.

10. A method as recited in claim 4 wherein the said traces are impressed on the record by cutting into the surface of the record with the impressing members, and filling the grooves so cut with an opaque material.

11. A method as recited in claim 4 wherein said impressing members have predetermined flux-transmissive characteristics and the areas between said impressing members have different flux-transmissive characteristics.

12. The method as recited in claim 4 wherein said impressing members are adapted to shield light from said record.

13. The method as recited in claim 4 wherein the record is formed of light sensitive film and the members expose certain areas of the record to light while shielding other areas on the record.

14. The method as recited in claim 4 wherein the impressing members are a portion of a magnetic circuit and magnetized traces are impressed upon said record by the members.

15. A method as recited in claim 4 wherein the record is formed of a magnetic flux-receptive material and together with said impressing members form a portion of a magnetic circuit for impressing magnetized traces on said record.

16. The method of representing controlled movements of a member on a control record including the steps of defining a control lane having a plurality of generally parallel traces on said record, measuring the movement of a member from instant to instant, displacing said traces as they are marked, while maintaining them in parallelism, with respect to a reference portion of said record in a direction corresponding to the movement of said member.

17. A method as recited in claim 16 further characterized by defining a plurality of lanes on said record with a control lane being defined for each coordinate of movement of the member.

18. A method as recited in claim 5 wherein said members have a predetermined magnetic polarity and the members are disposed in magnetic circuit relation to said record.

19. An assembly for representing controlled movements of a member on a control record, including a relatively thin record member, means for supporting said record for movement along a predetermined path, means for moving the record, a record-marking assembly positioned closely adjacent to the surface of the record, said assembly including a plurality of uniformly spaced marking members mounted and constructed for effective movement transversely to the path of movement of said record, and means for moving said members as a group in a direction and at a rate corresponding to movement of the member represented, said assembly adapted to establish a plurality of flux-transmissive parallel traces on said record.

20. An assembly for representing controlled movements of a member on a control record including a relatively thin and elongated record, means for supporting said record for movement along a predetermined path, means for moving the record, a record-marking assembly positioned closely adjacent to the surface of the record, said assembly including a plurality of generally equally spaced marking members mounted for movement transversely to the path of movement of said record, and means for moving said members in unison maintaining their spacing transversely to said record in a direction corresponding to movement of the member represented and in response to the movement thereof, said assembly adapted to establish a plurality of parallel traces having minimum flux resistance.

21. An assembly as recited in claim 20 wherein said members are constructed to cut into the surface of a record which has an ink coated upper surface.

22. An assembly as recited in claim 20 wherein said members are constructed to cut into the surface of the record.

23. An assembly as recited in claim 20 wherein said record is formed of light sensitive film and said members are constructed to shield light from portions of the record adjacent to the members.

24. An assembly as recited in claim 20 wherein said members are formed as a portion of a magnetic circuit whereby traces of predetermined polarity are impressed upon said record.

25. The method of recording displacements of a point in a plurality of reference planes on a lineally extending control member including the steps of moving said control member, establishing a plurality of control channels of uniform width each having a plurality of parallel flux transmissive traces, on said control member in parallelism with its direction of movement, simultaneously maintaining the traces in each channel in parallelism while displacing said traces transversely to the direction of movement of said control member proportionally to the displacement of said point in said planes.

References Cited in the file of this patent

UNITED STATES PATENTS

| | | |
|---|---|---|
| 1,199,980 | Gilbreth | Oct. 3, 1916 |
| 1,269,525 | Craighead | June 11, 1918 |
| 1,732,718 | Gluer | Oct. 22, 1929 |
| 1,865,373 | Idrac | June 28, 1932 |
| 1,869,828 | Shrader | Aug. 2, 1932 |
| 1,880,942 | Erickson | Oct. 4, 1932 |
| 1,933,356 | Warner | Oct. 31, 1933 |
| 2,092,142 | Schuz | Sept. 7, 1937 |
| 2,131,741 | Kleinschmidt et al. | Oct. 4, 1938 |
| 2,213,108 | Pollard | Aug. 27, 1940 |
| 2,258,700 | Doll | Oct. 14, 1941 |
| 2,336,376 | Tandler et al. | Dec. 7, 1943 |
| 2,356,584 | Hell | Aug. 22, 1944 |
| 2,427,421 | Rieber | Sept. 16, 1947 |
| 2,537,770 | Livingston et al. | Jan. 9, 1951 |